United States Patent
Hatakeyama

(10) Patent No.: US 8,896,938 B2
(45) Date of Patent: Nov. 25, 2014

(54) CATADIOPTRIC LENS SYSTEM AND IMAGING APPARATUS

(75) Inventor: Takeshi Hatakeyama, Chiba (JP)

(73) Assignee: Sony Corporation, Tokyo (JP)

(*) Notice: Subject to any disclaimer, the term of this patent is extended or adjusted under 35 U.S.C. 154(b) by 189 days.

(21) Appl. No.: 13/482,637

(22) Filed: May 29, 2012

(65) Prior Publication Data

US 2013/0010180 A1 Jan. 10, 2013

(30) Foreign Application Priority Data

Jul. 5, 2011 (JP) .................................. 2011-149110

(51) Int. Cl.
*G02B 17/00* (2006.01)
*G02B 17/08* (2006.01)
*G02B 15/173* (2006.01)
*G02B 27/64* (2006.01)

(52) U.S. Cl.
CPC .......... *G02B 27/646* (2013.01); *G02B 17/0808* (2013.01); *G02B 15/173* (2013.01); *G02B 17/0856* (2013.01)
USPC .......................... 359/731; 359/366; 359/557

(58) Field of Classification Search
CPC .... G02B 17/08; G02B 19/00; G02B 17/0804; G02B 17/0808; G02B 17/0856; G02B 17/0864
USPC .......... 359/201.1, 201.2, 208.1, 208.2, 212.1, 359/212.2, 219.2, 220.1, 221.1, 223.1, 364, 359/555, 556, 557, 726, 727, 730, 731, 850, 359/856, 201.3, 554, 728, 729; 353/37, 50, 353/64, 73, 77, 99
See application file for complete search history.

(56) References Cited

U.S. PATENT DOCUMENTS

| | | | | | |
|---|---|---|---|---|---|
| 4,264,136 | A | * | 4/1981 | Ogino | 359/731 |
| 4,794,416 | A | * | 12/1988 | Mukai et al. | 396/114 |
| 4,916,473 | A | * | 4/1990 | Mukai et al. | 396/114 |
| 4,951,078 | A | * | 8/1990 | Okada | 396/114 |
| 5,331,467 | A | * | 7/1994 | Sato | 359/731 |
| 7,502,177 | B2 | * | 3/2009 | Shafer et al. | 359/726 |
| 2005/0248662 | A1 | * | 11/2005 | Yamazaki | 348/208.99 |
| 2006/0082905 | A1 | * | 4/2006 | Shafer et al. | 359/727 |
| 2008/0030872 | A1 | * | 2/2008 | Nishioka et al. | 359/683 |
| 2008/0252964 | A1 | * | 10/2008 | Koenig | 359/366 |
| 2009/0002842 | A1 | * | 1/2009 | Souma | 359/684 |
| 2009/0002846 | A1 | * | 1/2009 | Souma | 359/695 |
| 2009/0102937 | A1 | * | 4/2009 | Yilmaz et al. | 348/222.1 |
| 2009/0185153 | A1 | * | 7/2009 | Epple | 355/67 |

FOREIGN PATENT DOCUMENTS

| | | |
|---|---|---|
| JP | 55-032023 | 3/1980 |
| JP | 58-205124 | 11/1983 |

* cited by examiner

*Primary Examiner* — William Choi
*Assistant Examiner* — Collin X Beatty
(74) *Attorney, Agent, or Firm* — Rader, Fishman & Grauer PLLC

(57) ABSTRACT

A catadioptric lens system includes, in order of light travel: a first lens group that includes a concave mirror and a convex mirror and has a positive refractive power; a second lens group that is positioned on the image side of the concave mirror and has a negative refractive power; and a third lens group that has a positive refractive power, wherein the first lens group has a plurality of lenses on the image side of the concave mirror, and some lenses of the plurality of lenses are formed as a vibration-proof group so as to be movable in a direction perpendicular to an optical axis.

11 Claims, 13 Drawing Sheets

EXAMPLE 3

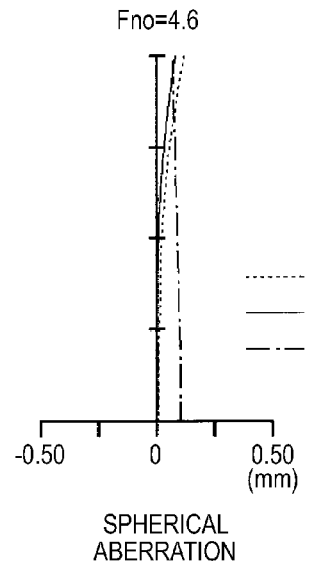
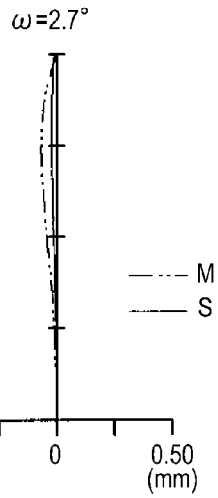
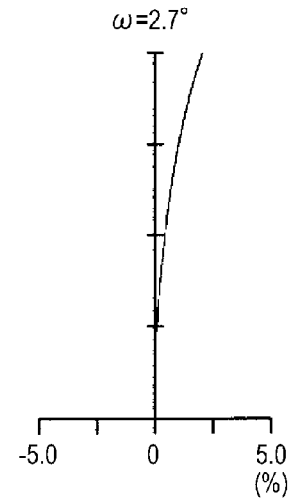
FIG.4A / FIG.4B / FIG.4C — EXAMPLE 1 · INFINITY FOCUSING
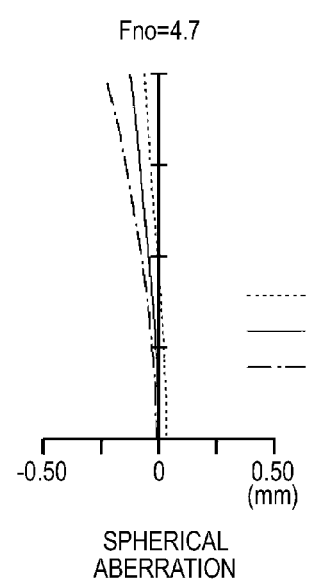
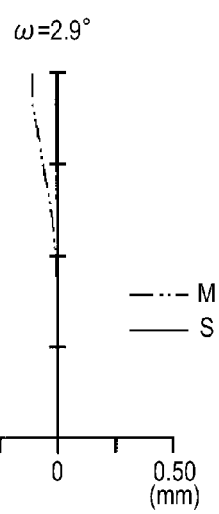
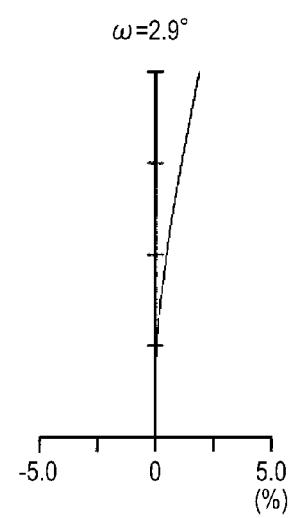
FIG.5A / FIG.5B / FIG.5C — EXAMPLE 1 · CLOSE-UP FOCUSING ($\beta = 0.1$)

EXAMPLE 1 · LATERAL ABERRATIONS DURING INFINITY FOCUSING
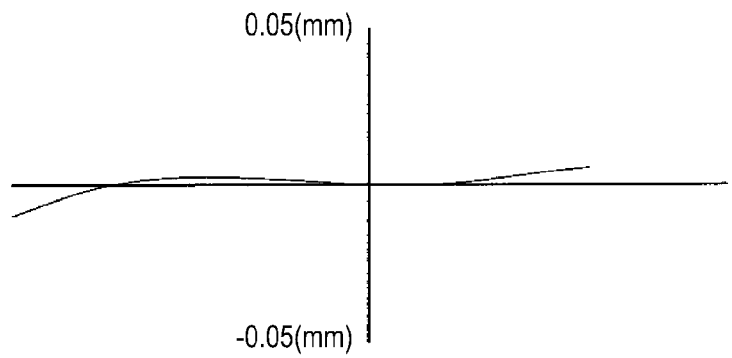
FIG.6A ω=2.7°
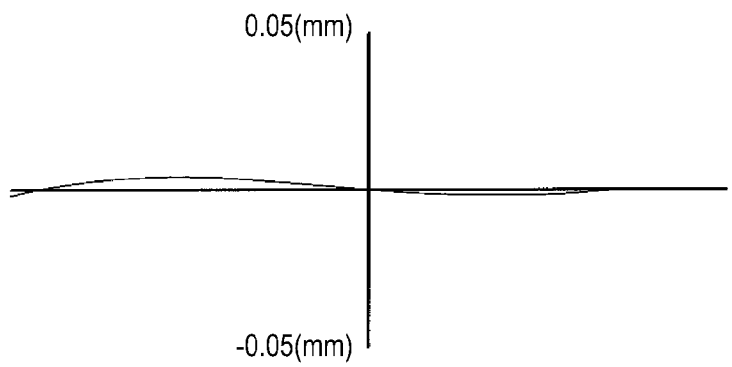
FIG.6B ω=1.9°
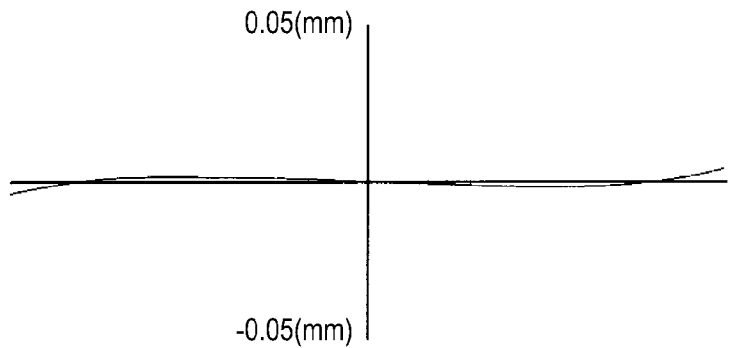
FIG.6C ω=0°

EXAMPLE 1 · LATERAL ABERRATIONS DURING
INFINITY FOCUSING (LENS SHIFT STATE OF 0.2°)
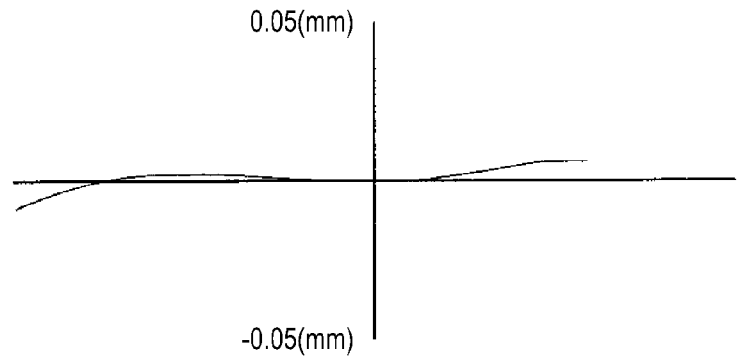
FIG.7A  ω=2.9°
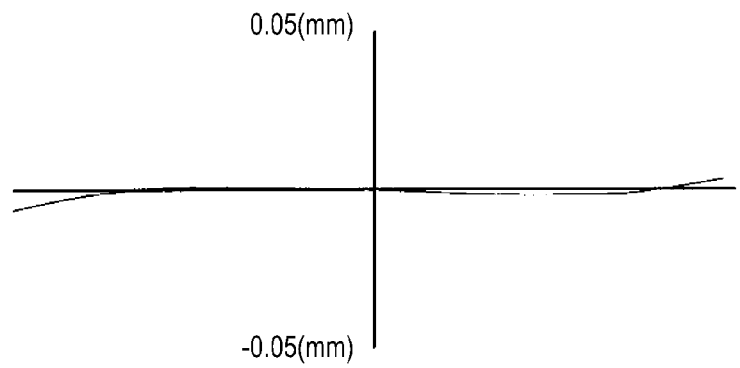
FIG.7B  ω=0.2°
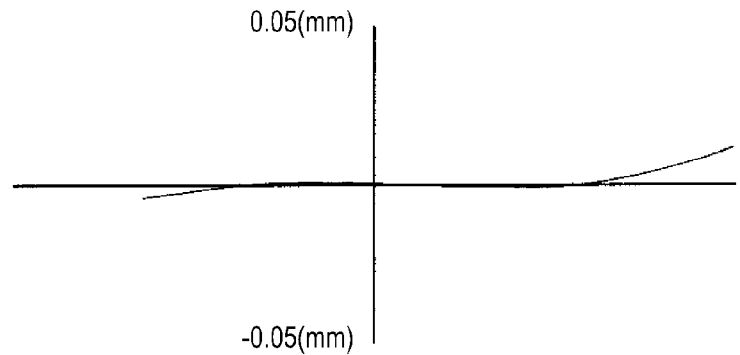
FIG.7C  ω=-2.5°

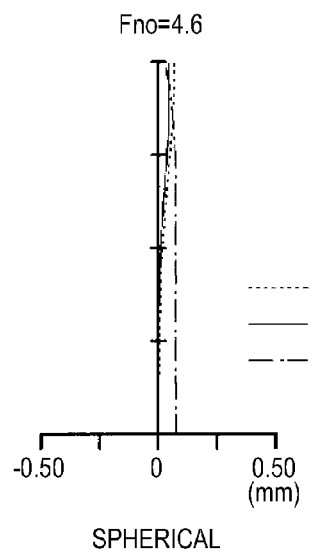
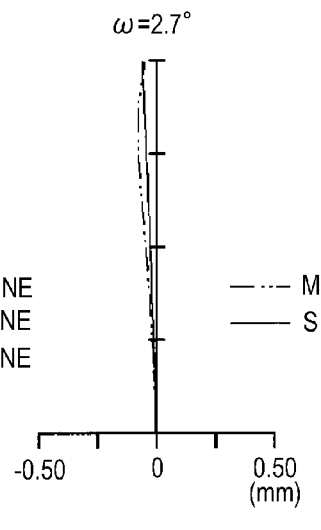
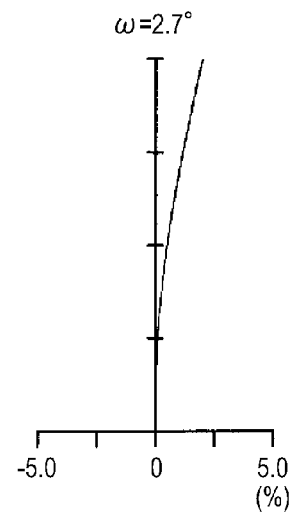
FIG.8A / FIG.8B / FIG.8C — EXAMPLE 2 · INFINITY FOCUSING
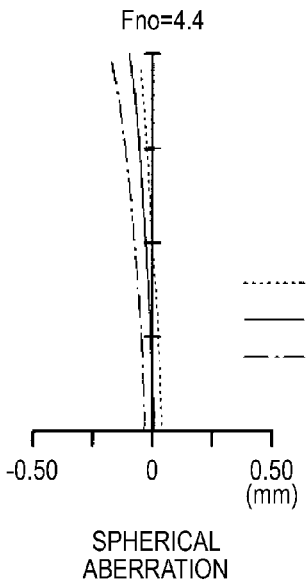
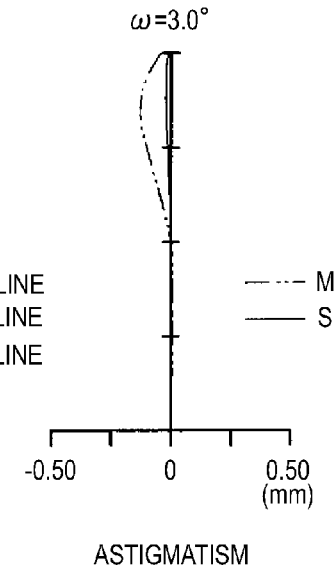
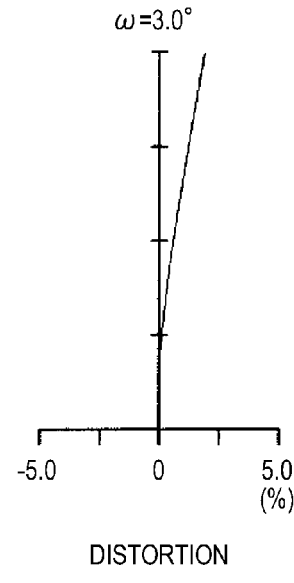
FIG.9A / FIG.9B / FIG.9C — EXAMPLE 2 · CLOSE-UP FOCUSING ($\beta = 0.1$)

EXAMPLE 2 · LATERAL ABERRATIONS DURING INFINITY FOCUSING
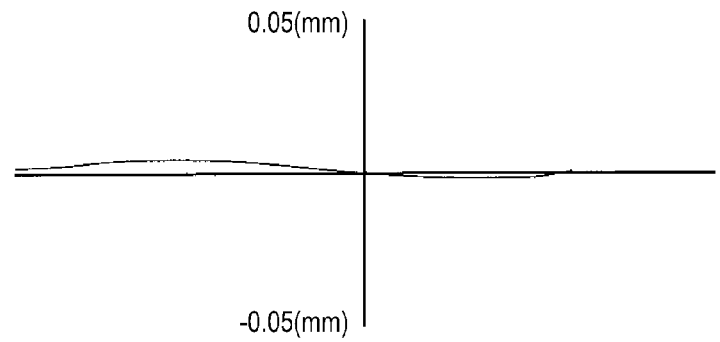
FIG.10A  ω=2.7°
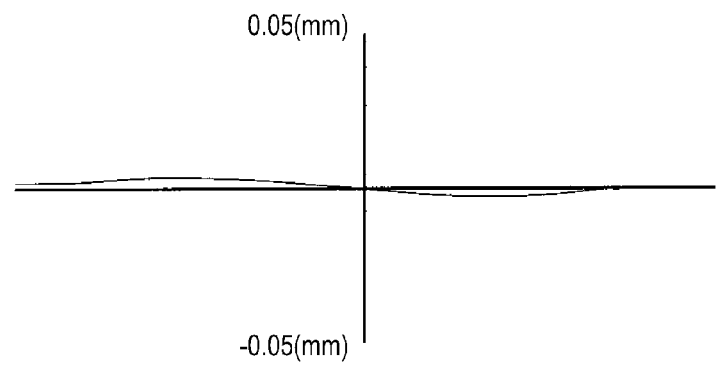
FIG.10B  ω=1.9°
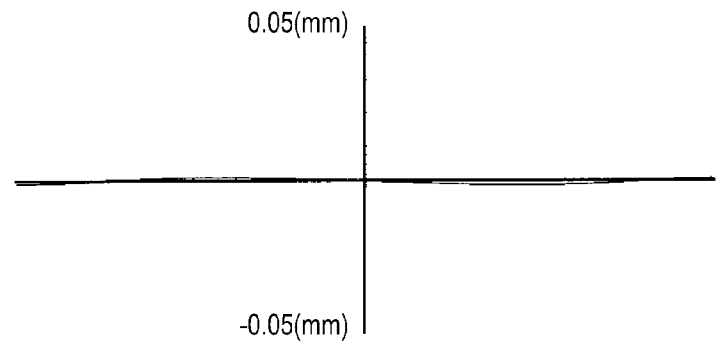
FIG.10C  ω=0°

EXAMPLE 2 · LATERAL ABERRATIONS DURING
INFINITY FOCUSING (LENS SHIFT STATE OF 0.2°)
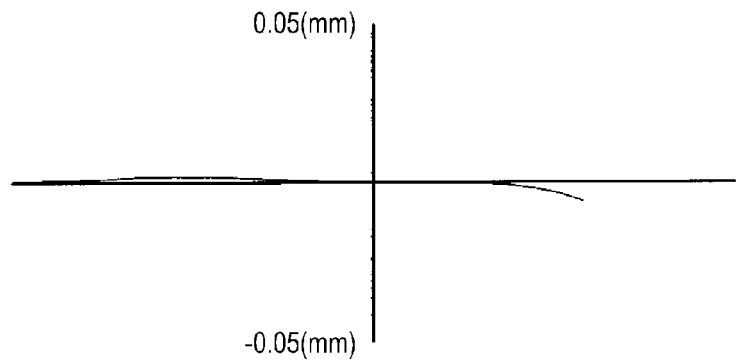
FIG.11A ω=2.9°
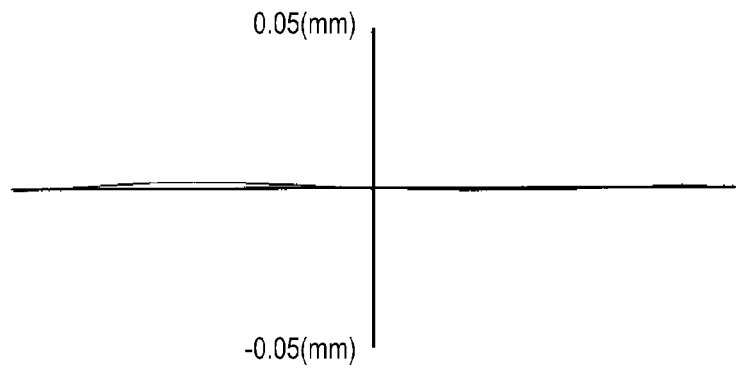
FIG.11B ω=0.2°
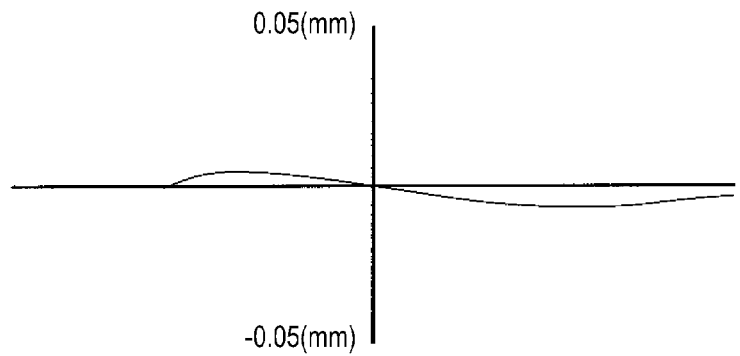
FIG.11C ω=-2.5°

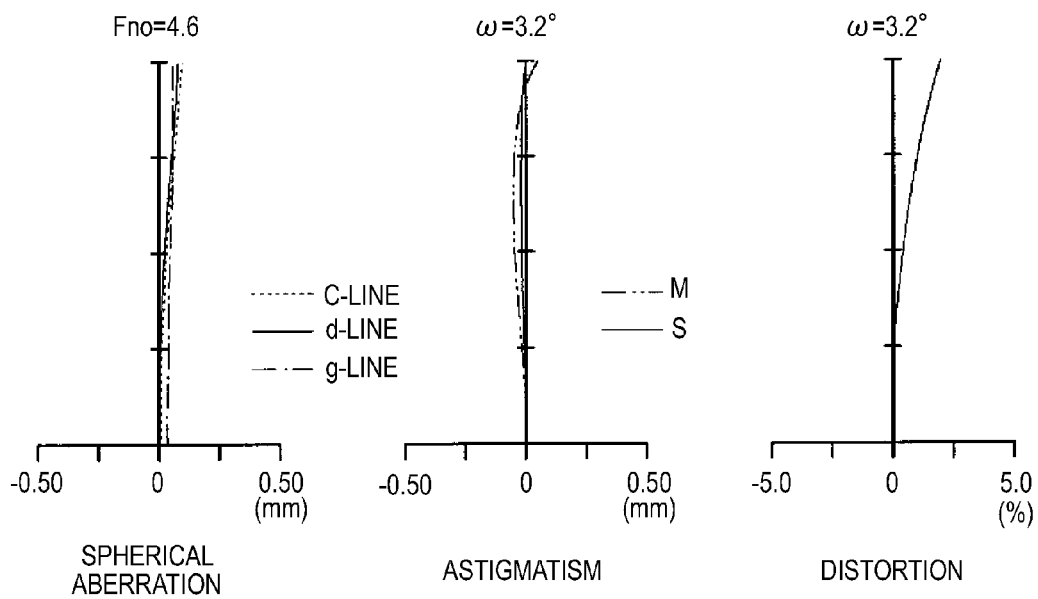
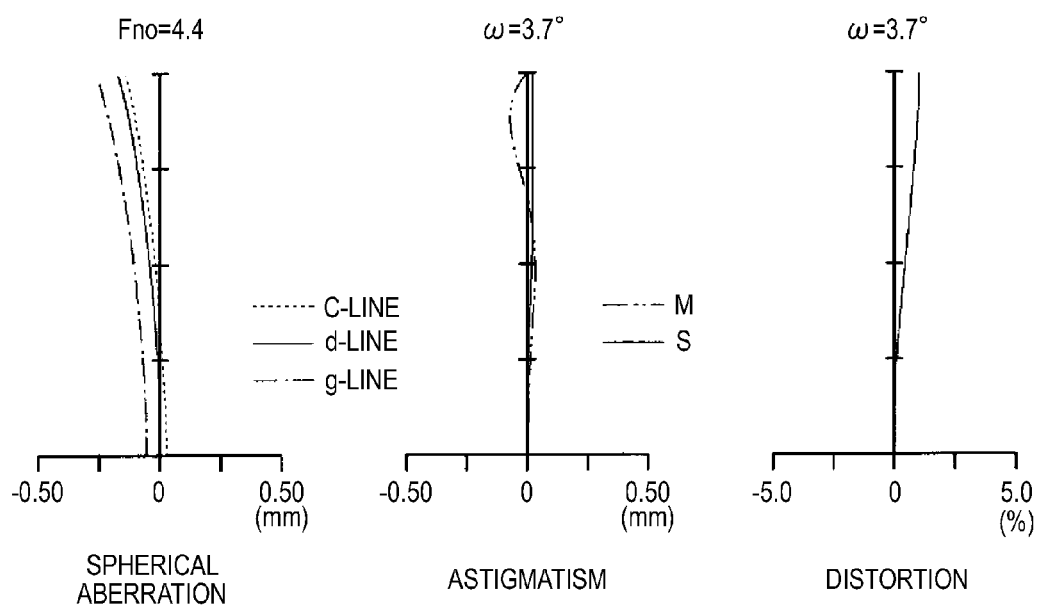

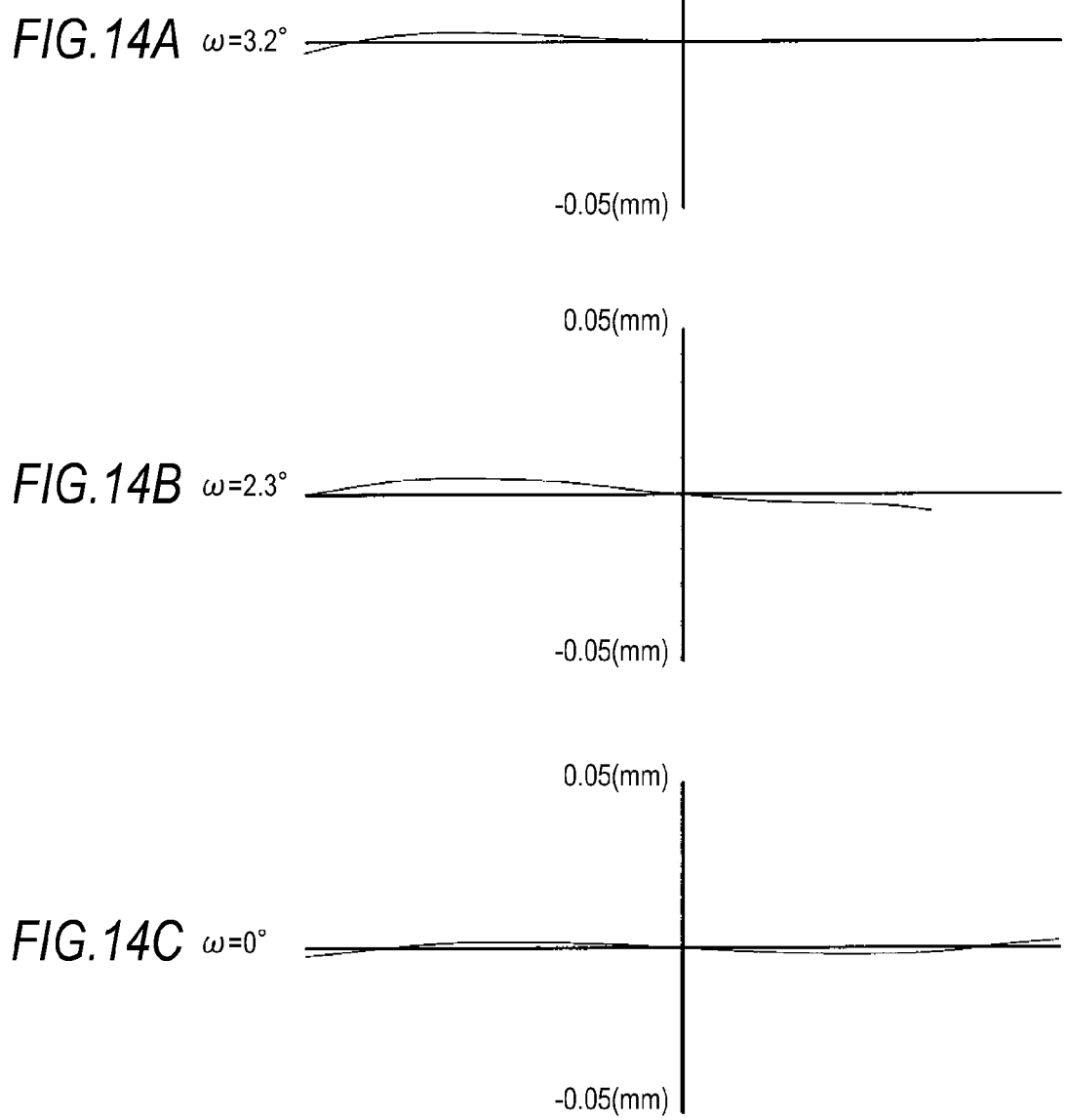
EXAMPLE 3 · LATERAL ABERRATIONS DURING INFINITY FOCUSING
FIG.14A ω=3.2°
FIG.14B ω=2.3°
FIG.14C ω=0°

EXAMPLE 3 · LATERAL ABERRATIONS DURING
INFINITY FOCUSING (LENS SHIFT STATE OF 0.2°)
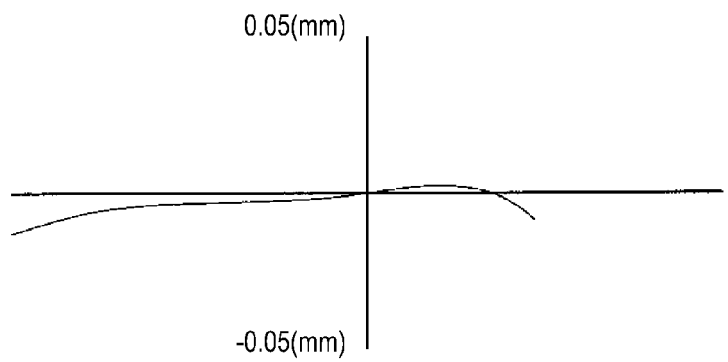
FIG.15A  $\omega=3.4°$
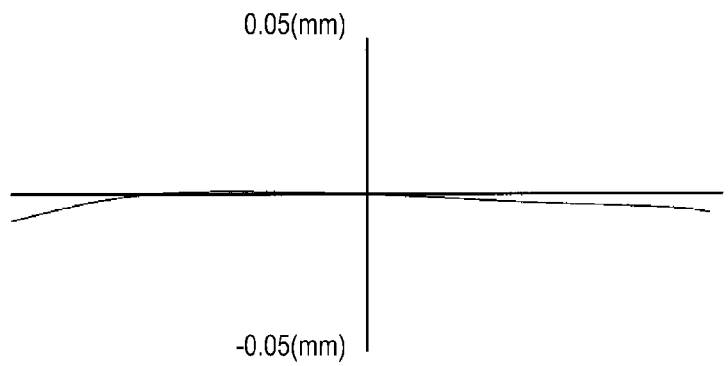
FIG.15B  $\omega=0.2°$
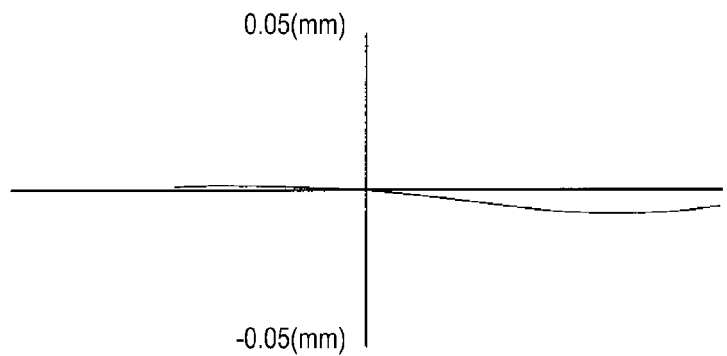
FIG.15C  $\omega=-3.0°$

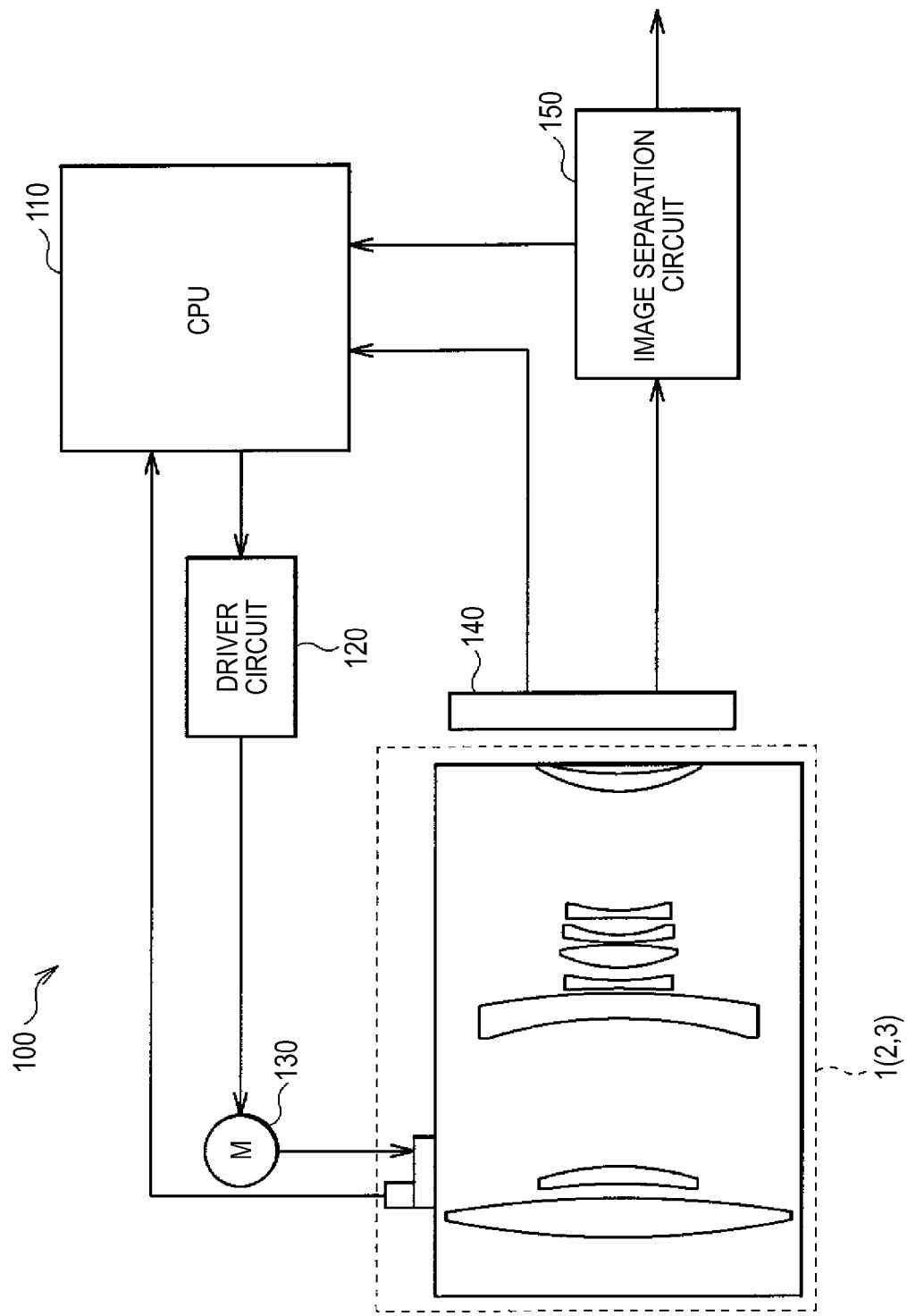

CATADIOPTRIC LENS SYSTEM AND IMAGING APPARATUS

FIELD

The present disclosure relates to a catadioptric lens system which is capable of correcting hand shake and is quite appropriate to capture not only a still image but also a moving image, with a long focal length, and an imaging apparatus having the catadioptric lens system.

BACKGROUND

It is generally known that a catadioptric lens system having a reflective system and a refractive system is highly advantageous in reducing the length of the whole lens and reducing chromatic aberration, and is configured to be appropriate for a long-focus lens. For example, in JP-A-55-32023, it is possible to obtain favorable imaging performance through a catadioptric lens system that includes, in order of light travel, a positive single lens, a primary rear surface reflection mirror having a negative meniscus shape, a secondary rear surface reflection mirror having a positive meniscus shape, and a lens group having a negative refractive power.

As focusing modes of the catadioptric lens system, a mode of varying the length of the whole lens, such as a mode of extending the whole lens or a mode of changing a space between two reflective surfaces, have been generally used. Further, for example, JP-A-58-205124 discloses a catadioptric lens system of an inner focusing mode in which the length of the whole optical system is invariant. The catadioptric lens system includes, in order of light travel: a first lens group that includes a reflecting member and has a positive refractive power; and a second lens group that is movable along the optical axis and has a negative refractive power; and a third lens group that has a positive refractive power. In the system, in a state where the focus is at infinity, an afocal system is formed of the first lens group and the second lens group, and the second lens group is moved to be close to the image side, whereby a close-range object is brought into focus.

Meanwhile, in recent years, there have been provided so-called single-lens mirrorless cameras each having portability which is improved by removing mirrors from a single-lens reflex camera so as to simplify a camera structure. The single-lens mirrorless camera is appropriate to capture a moving image with high image quality since light constantly reaches an imaging device for image capturing contrary to the single-lens reflex camera. Further, a so-called wobbling technique has been used. In the technique, in the case of capturing a moving image, when an object is shifted back and forth relative to a camera during capturing, in order to bring the object into focus, the focal point is shifted in a direction capable of obtaining a high contrast value by minutely wobbling the focal point. When the focusing group is intended to perform the wobbling action, it is preferable that the focusing group be configured to have a small size and be lightweight as much as possible by setting a focusing mode to the inner focusing mode. By making the focusing group have a small size and be light, it is possible to reduce the size of the whole lens including a driving mechanism of the focusing group, and it is possible to reduce power consumption caused by focus driving.

SUMMARY

When the focusing mode is the mode of extending the whole lens, if the focal length of the lens is increased, the extension amount for focusing is extremely increased, and thus this mode is disadvantageous to reduction in size. Further, since it is necessary for the driving mechanism for continuously extending the whole lens to generate a large driving force, it is difficult to deal with capturing of a moving image through a wobbling action.

When the focusing mode is the mode of changing the space between two reflective surfaces, it is possible to extremely decrease the extension amount, but it is necessary for the driving mechanism to generate a large driving force. Hence, likewise, it is difficult to deal with capturing of a moving image. Further, eccentricity between two reflective surfaces is extremely sensitive to the optical performance thereof, but it is difficult to sufficiently reduce the eccentricity caused by focusing in manufacturing. Furthermore, since change in distance between two reflective surfaces is also optically sensitive, a problem remains in design in that the fluctuation in aberration during close-up focusing is increased.

In the catadioptric lens system disclosed in JP-A-58-205124, the inner focusing mode is adopted, and the focusing group does not include a large mirror lens with a large weight. Hence, as compared with the mode of extending the whole lens or the mode of changing the space between two reflective surfaces, it is possible to decrease the driving force of the driving mechanism. However, since the focusing group is shifted between the two reflective surfaces, or near the reflective surfaces, it is difficult to secure sufficient space for arrangement of the driving mechanism. As a result, a problem arises in that the lens size is increased. Further, although a hole is bored at the center portion of the mirror lens and the optical system is disposed at the hole portion, it is difficult to perform processing of boring a hole through the mirror lens, and it is also difficult to provide a mechanism which holds the optical system near the hole portion. Furthermore, although the eccentricity of the focusing group is sensitive to the optical performance, it is difficult to sufficiently reduce the eccentricity caused by the focusing in manufacturing. In addition, in order to reduce the fluctuation in aberration during the close-up focusing, it is necessary to adopt a configuration in which the number of lenses is set to be large. As a result, there is a problem in that the weight of the focusing group is increased and the size of the driving mechanism is increased.

However, blur is caused in a captured image by hand shake at the time of photography or vibration transferred to a photographing system in a case of photographing a moving object such as a vehicle. In particular, in the long-focus lens, the angle of view is extremely reduced, and thus significant image blur is produced by minute hand shake. As means for correcting such image blur, a so-called hand shake correction optical system, which corrects image blur by shifting some lens groups constituting the lens system in the direction approximately perpendicular to the optical axis and shifting the image position and corrects fluctuation in aberration caused when shifting the image position, has been used. In the hand shake correction optical system, on the basis of the blur correction coefficient, image shift caused by hand shake and the like is corrected. Assuming that the focal length of the whole lens system is f and the angle of hand shake is θ, the amount of image shift yb caused by the hand shake is calculated as follows.

$$yb = f \cdot \tan\theta$$

Assuming that the blur correction coefficient of the shifted lens group is βs, the amount of lens shift SL necessary to correct the amount of image shift yb is as follows.

$$SL = -f \cdot \tan\theta / \beta s$$

Hence, as the blur correction coefficient βs is large, it is possible to correct the hand shake with a small amount of lens shift SL. The hand shake correction optical system is able to function as an optical handshake correction system through combination of, for example, the detection system that detects camera shake caused by hand shake, a control system that applies the correction amount to the lens position on the basis of the signal which is output from the detection system, and a driving system that shifts a prescribed lens on the basis of the output from the control system.

However, since the catadioptric lens system generally has a long focal length, the amount of lens shift of the vibration-proof group for correcting image blur is extremely increased. Hence, as fluctuation in aberration at the time of lens shift is also increased, the image quality at the time of preventing vibration is remarkably deteriorated, the outer diameters of the lenses of the vibration-proof group are increased, and thus this system is disadvantageous to reduction in size. Further, because of increasing the weight of the vibration-proof group, large driving force is necessary. Therefore, the size of the driving mechanism is increased, and thus a problem arises in that it is also difficult to secure space for arrangement thereof. Because of the above-mentioned problem, in the catadioptric lens system of the related art, it is difficult to provide an optical vibration-proof function of optically correcting hand shake.

It is therefore desirable to provide a catadioptric long-focus lens system and an imaging apparatus capable of optically correcting hand shake and reducing the size of the lens including the driving mechanism by reducing the size and the weight of the vibration-proof group for correction.

An embodiment of the present disclosure is directed to a catadioptric lens system including, in order of light travel: a first lens group that includes a concave mirror and a convex mirror and has a positive refractive power; a second lens group that is positioned on the image side of the concave mirror and has a negative refractive power; and a third lens group that has a positive refractive power. The first lens group has a plurality of lenses on the image side of the concave mirror, and some lenses of the plurality of lenses are formed as a vibration-proof group so as to be movable in a direction perpendicular to an optical axis.

Another embodiment of the present disclosure is directed to an imaging apparatus including: a catadioptric lens system; and an imaging device that outputs a captured image signal corresponding to an optical image which is formed by the catadioptric lens system. The catadioptric lens system is formed as the catadioptric lens system according to the embodiment of the present disclosure.

In the catadioptric lens system or the imaging apparatus according to the embodiment of the present disclosure, some lenses, which are disposed on the image side of the concave mirror, are shifted as a vibration-proof group in the direction perpendicular to the optical axis.

According to the catadioptric lens system or the imaging apparatus of the embodiment of the present disclosure, some lenses, which are disposed on the image side of the concave mirror, in the first lens group are formed as a vibration-proof group, whereby the configuration of each group is optimized. Therefore, it is possible to obtain a long-focus lens system capable of optically correcting hand shake and reducing the size of the lens including the driving mechanism by reducing the size and the weight of the vibration-proof group for correction.

BRIEF DESCRIPTION OF THE DRAWINGS

FIGS. 4A to 4C are aberration diagrams illustrating various aberrations during infinity focusing of the catadioptric lens system corresponding to Numerical Example 1, where FIG. 4A shows spherical aberration, FIG. 4B shows astigmatism, and FIG. 4C shows distortion.

FIGS. 5A to 5C are aberration diagrams illustrating various aberrations during close-up focusing (photography magnification ratio β=0.1) of the catadioptric lens system corresponding to Numerical Example 1, where FIG. 5A shows spherical aberration, FIG. 5B shows astigmatism, and FIG. 5C shows distortion.

FIGS. 6A to 6C are aberration diagrams illustrating lateral aberrations during infinity focusing of the catadioptric lens system corresponding to Numerical Example 1.

FIGS. 7A to 7C are aberration diagrams illustrating lateral aberrations in a state where the lens is shifted by 0.2° during infinity focusing in the catadioptric lens system corresponding to Numerical Example 1.

FIGS. 8A to 8C are aberration diagrams illustrating various aberrations during infinity focusing of the catadioptric lens system corresponding to Numerical Example 2, where FIG. 8A shows spherical aberration, FIG. 8B shows astigmatism, and FIG. 8C shows distortion.

FIGS. 9A to 9C are aberration diagrams illustrating various aberrations during close-up focusing (photography magnification ratio β=0.1) of the catadioptric lens system corresponding to Numerical Example 2, where FIG. 9A shows spherical aberration, FIG. 9B shows astigmatism, and FIG. 9C shows distortion.

FIGS. 10A to 10C are aberration diagrams illustrating lateral aberrations during infinity focusing of the catadioptric lens system corresponding to Numerical Example 2.

FIGS. 11A to 11C are aberration diagrams illustrating lateral aberrations in a state where the lens is shifted by 0.2° during infinity focusing in the catadioptric lens system corresponding to Numerical Example 2.

FIGS. 12A to 12C are aberration diagrams illustrating various aberrations during infinity focusing of the catadioptric lens system corresponding to Numerical Example 3, where FIG. 12A shows spherical aberration, FIG. 12B shows astigmatism, and FIG. 12C shows distortion.

FIGS. 13A to 13C are aberration diagrams illustrating various aberrations during close-up focusing (photography magnification ratio β=0.1) of the catadioptric lens system corresponding to Numerical Example 3, where FIG. 13A shows spherical aberration, FIG. 13B shows astigmatism, and FIG. 13C shows distortion.

FIGS. 14A to 14C are aberration diagrams illustrating lateral aberrations during infinity focusing of the catadioptric lens system corresponding to Numerical Example 3.

FIGS. 15A to 15C are aberration diagrams illustrating lateral aberrations in a state where the lens is shifted by 0.2° during infinity focusing in the catadioptric lens system corresponding to Numerical Example 3.

FIG. 16 is a block diagram illustrating a configuration example of an imaging apparatus.

DETAILED DESCRIPTION

Hereinafter, embodiments of the present disclosure will be described with reference to the accompanying drawings.

[Lens Configuration]

Figure 1:
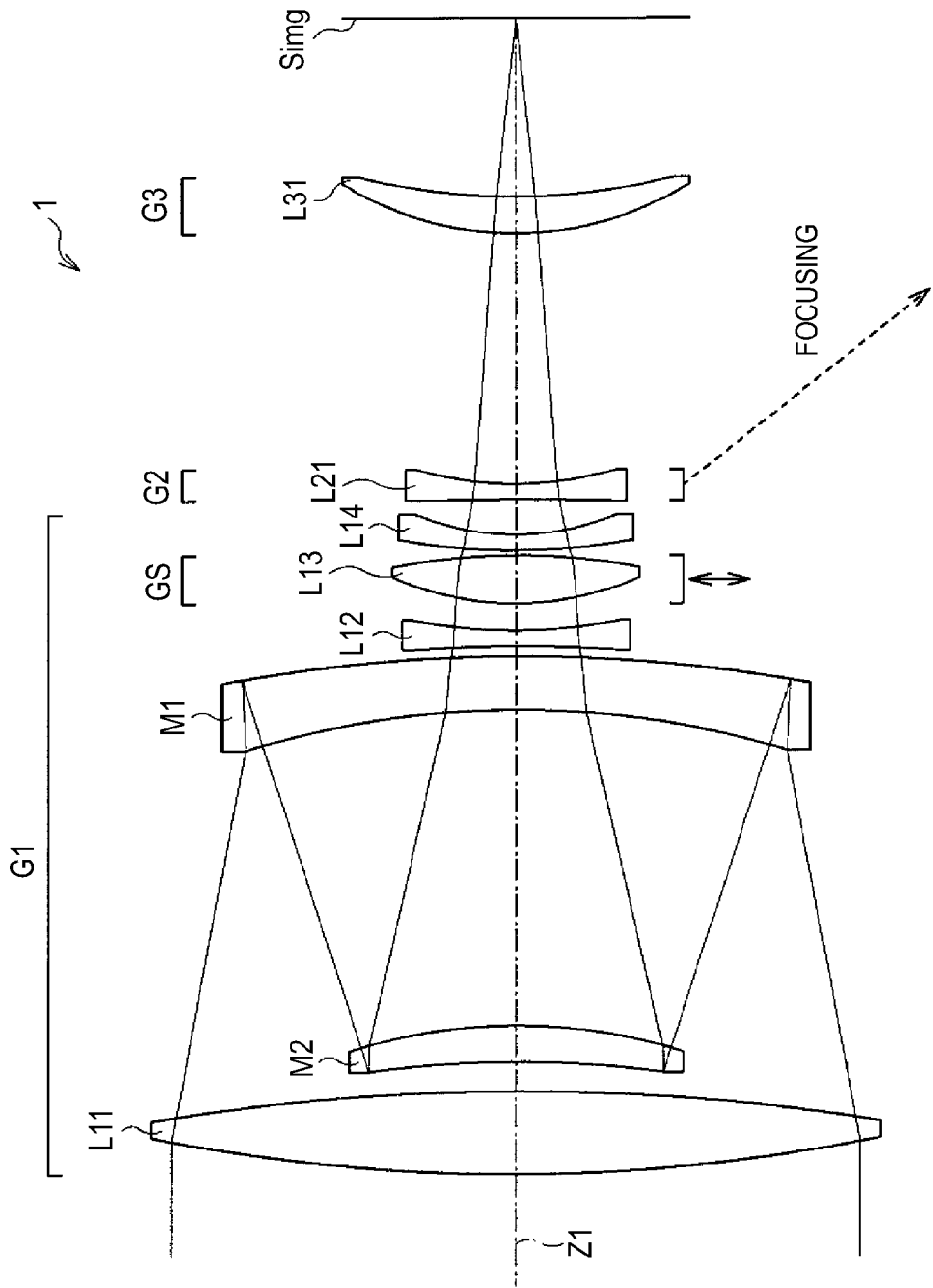
FIG. 1 is a cross-sectional view of a lens corresponding to Numerical Example 1, and shows a first configuration example of a catadioptric lens system according to an embodiment of the present disclosure.
Figure 2:
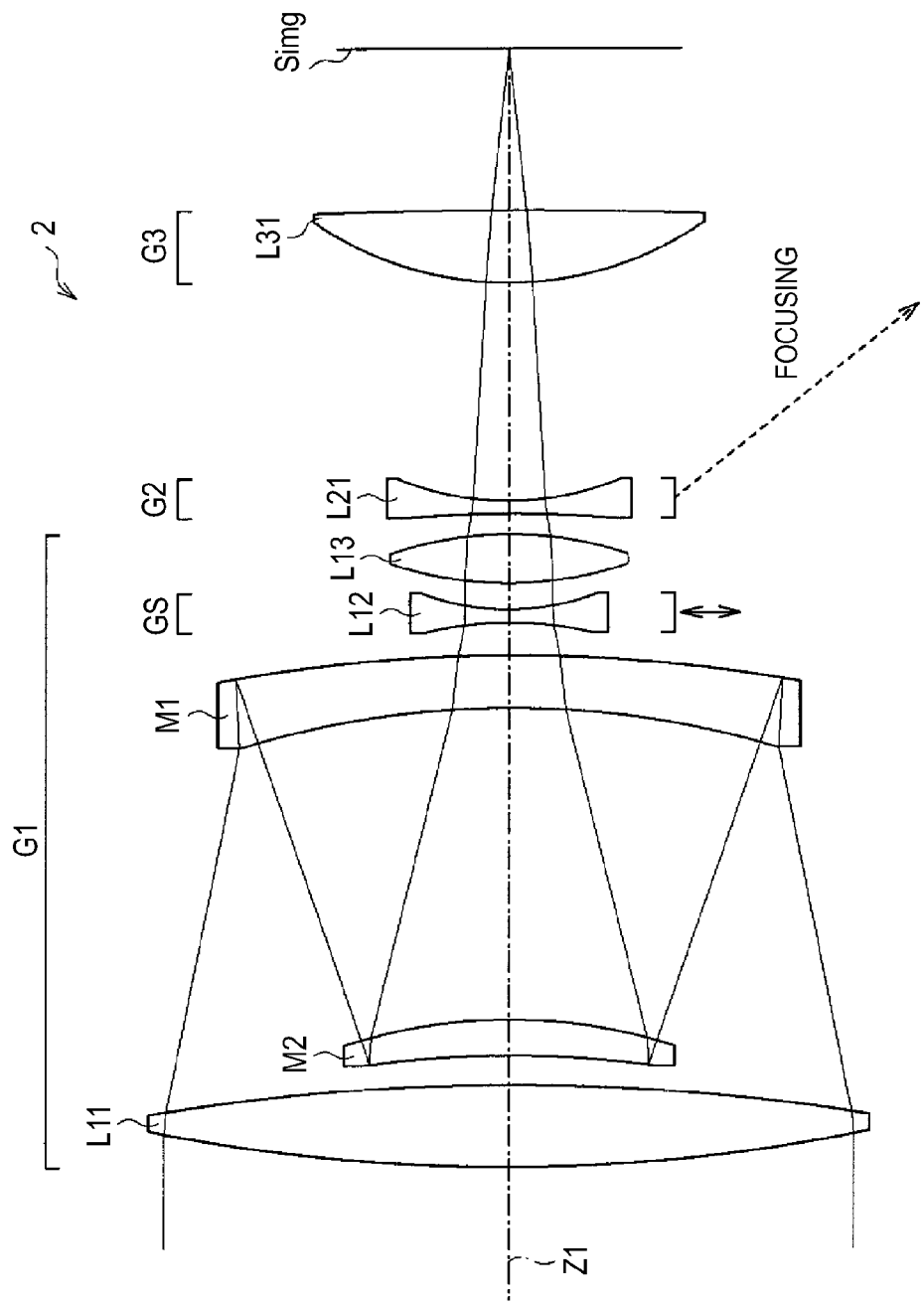
FIG. 2 is a cross-sectional view of a lens corresponding to Numerical Example 2, and shows a second configuration example of the catadioptric lens system.
Figure 3:
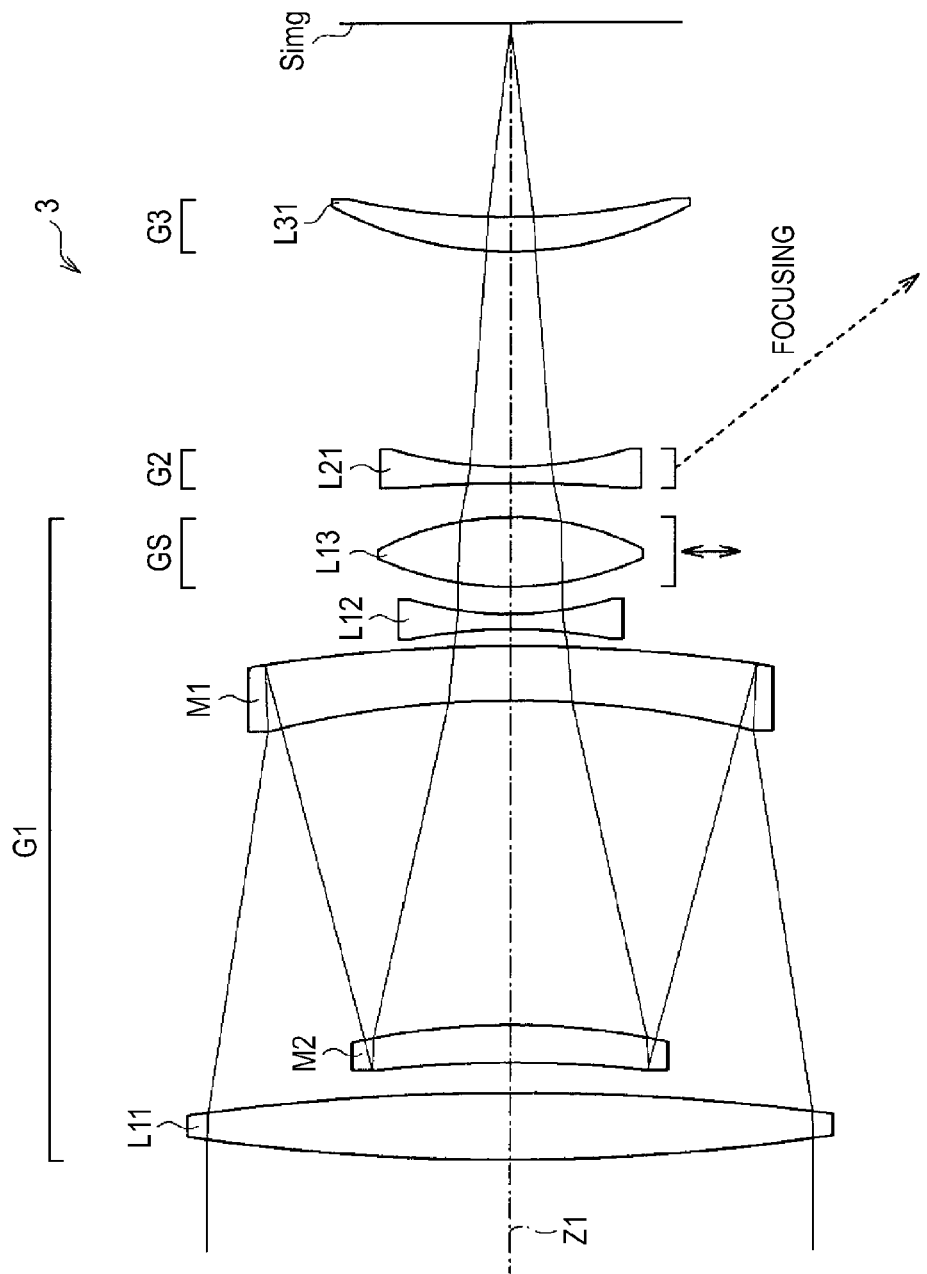
FIG. 3 is a cross-sectional view of a lens corresponding to Numerical Example 3, and shows a third configuration example of the catadioptric lens system.

FIG. 1 shows a first configuration example of a catadioptric lens system according to an embodiment of the present disclosure. The configuration example corresponds to a lens configuration of Numerical Example 1 to be described later. Note that, FIG. 1 corresponds to lens arrangement during infinity focusing. Likewise, FIGS. 2 to 3 show configurations of the cross sections of second to third configuration examples corresponding to lens configurations of Numerical Examples 2 to 3 to be described later. In FIGS. 1 to 3, the reference sign Simg represents the image plane.

The catadioptric lens system according to the present embodiment includes, in the order that light travels from the object side along the optical axis Z1: a first lens group G1 that includes a concave mirror (primary mirror) M1 and a convex mirror (secondary mirror) M2 and has a positive refractive power; a second lens group G2 that is positioned on the image side of the concave mirror M1 and has a negative refractive power; and a third lens group G3 that has a positive refractive power. The catadioptric lens system is focused on the close-range object by shifting the second lens group G2 in the direction substantially parallel with the optical axis Z1. The first lens group G1 and the third lens group G3 remain stationary during focusing.

The first lens group G1 has a plurality of lenses on the image side of the concave mirror M1, and some lenses of the plurality of lenses are formed as a vibration-proof group GS so as to be movable in the direction perpendicular to the optical axis Z1, whereby it is possible to correct image blur. It is preferable that the vibration-proof group GS have at least one aspheric surface. For example, the first lens group G1 has, in order from the object side, a negative lens and a positive lens on the image side of the concave mirror M1, where it is preferable that the positive lens be the vibration-proof group GS. As specific examples of the above configuration, there are provided configurations of imaging lenses 1 and 3 (FIGS. 1 and 3) according to first and third configuration examples. Further, the plurality of lenses in the first lens group G1 may have a negative lens at a position closest to the object side, and the negative lens may be formed as the vibration-proof group GS. As a specific example of the above configuration, there is provided a configuration of an imaging lens 2 (FIG. 2) according to second configuration example.

It is preferable that the second lens group G2 be formed of a single lens having a biconcave shape. It is preferable that the third lens group G3 be formed of a single lens of which the object-side surface has a convex shape.

It is preferable that the image-side surface of the concave mirror (primary mirror) M1 be formed by forming a reflective surface on a part of the image-side surface in a lens which is concave toward the object side. It is preferable that the object-side surface of the convex mirror M2 be formed by forming a reflective surface on the object-side surface in a lens which is convex toward the image side.

It is preferable that the catadioptric lens system according to the present embodiment appropriately satisfy the following conditional expressions. As described below, all the catadioptric lens systems 1 to 3 according to the first to third configuration examples as specific configuration examples satisfy the following conditional expressions.

$$0.03 < |fB/f| < 0.15 \quad (1)$$

$$0.10 < |\Delta D/fB| < 0.50 \quad (2)$$

$$0.40 < f1/f < 0.80 \quad (3)$$

$$-0.20 < f2/f < -0.05 \quad (4)$$

$$0.40 < f/f12 < 1.00 \quad (5)$$

$$0.10 < f3/f < 0.40 \quad (6)$$

Here, f is the focal length of the whole system in a state where the focus is at infinity, fB is the focal length of the vibration-proof group GS, $\Delta D$ is the space between a vertex of a reflective surface of the concave mirror M1 and the object-side principal point of the vibration-proof group GS in the direction of the optical axis, f12 is the composite focal length of the first lens group G1 and the second lens group G2 in the state where the focus is at infinity, f1 is the focal length of the first lens group G1, f2 is the focal length of the second lens group G2, and f3 is the focal length of the third lens group G3.

Effects and Advantages

Next, effects and advantages of the catadioptric lens system according to the present embodiment will be described.

In the catadioptric lens system, some lenses, which are positioned on the image side of the concave mirror M1, in the first lens group G1 are formed as the vibration-proof group GS. Therefore, it is possible to sufficiently reduce the diameter of the vibration-proof group GS as compared with the diameter of the concave mirror M1. Accordingly, it is easy to secure a space in which a driving mechanism for driving the vibration-proof group GS is disposed. Further, it is also possible to reduce the weight of the vibration-proof group GS, and thus it is possible to reduce the size of the driving mechanism.

In the catadioptric lens system, in any case where the vibration-proof group GS has a positive refractive power or a negative refractive power, the vibration-proof group GS has an aspheric shape in which the refractive power thereof is strong near the optical axis and the refractive power gradually decreases as the distance from the optical axis increases. Thereby, it is possible to satisfactorily correct coma aberration even in a state where hand shake is corrected.

The vibration-proof group GS is able to improve the vibration-proof effect such that the amount of incident rays increases. Accordingly, when the positive lens is formed as the vibration-proof group GS (FIGS. 1 and 3), the negative lens is disposed on the object side of the positive lens, whereby incident rays spread and thus it is possible to improve the vibration-proof effect. Further, when the negative lens is formed as the vibration-proof group GS (FIG. 2), among the plurality of lenses close to the image side of the concave mirror M1 in the first lens group G1, the negative lens as the vibration-proof group GS is disposed to be closest to the object side, and the vibration-proof group GS is disposed at a position where incident rays are relatively spread, whereby it is possible to improve the vibration-proof effect.

The Conditional Expression (1) defines the magnitude of the focal length fB of the vibration-proof group GS relative to the focal length of the whole lens system. If the result value of the Conditional Expression (1) is less than the lower limit thereof, the refractive power of the vibration-proof group GS is excessively increased. Hence, the absolute value of the blur correction coefficient of the vibration-proof group GS is increased, and the vibration-proof stroke is decreased. However, the fluctuation in aberration at the time of preventing vibration is increased, and the image quality at the time of preventing vibration is remarkably deteriorated. If the result value of the Conditional Expression (1) is greater than the upper limit thereof, the refractive power of the vibration-proof group GS is excessively decreased. Hence, the absolute value of the blur correction coefficient of the vibration-proof group GS is decreased, and the amount of lens shift of the vibration-proof group GS is increased. Furthermore, the diameter of the vibration-proof group GS is increased, and thus the weight of the vibration-proof group GS is increased. As a result, the size of the driving mechanism is increased, and thus this is disadvantageous to reduction in size. Accordingly, by making the catadioptric lens system satisfy the Conditional Expression (1), it is possible to reduce the size thereof and the space for arrangement of the driving mechanism and the vibration-proof group GS even in the case of long focal length, and it is possible to achieve a reflecting telephoto lens system having an optical vibration-proof function by which deterioration in image quality is low even at the time of preventing vibration. In order to improve this effect, it is more preferable that the numerical range of the Conditional Expression (1) be set as the following Conditional Expression (1)'.

$$0.06 < |fB/f| < 0.10 \qquad (1)'$$

The Conditional Expression (2) defines a value which is obtained by dividing the distance in the optical axis from the reflective surface of the concave mirror M1 to the object-side principal point of the vibration-proof group GS in the first lens group G1 by the focal length fB of the vibration-proof group GS. If the result value of the Conditional Expression (2) is less than the lower limit thereof, the vibration-proof group GS becomes too close to the reflective surface of the concave mirror M1. Hence, it is difficult to secure the movable range of the vibration-proof group GS and the space for arrangement of the driving mechanism. If the result value of the Conditional Expression (2) is greater than the upper limit thereof, the refractive power of the vibration-proof group GS is excessively increased. Hence, the fluctuation in aberration at the time of preventing vibration is increased, and the image quality at the time of preventing vibration is remarkably deteriorated. Further, interference with the other driving mechanisms such as the driving mechanism of the focusing group tends to occur. Accordingly, by making the catadioptric lens system satisfy the Conditional Expression (2), it becomes easier to arrange the driving mechanism of the vibration-proof group GS, and it is possible to improve the image quality at the time of preventing vibration. In order to improve this effect, it is more preferable that the numerical range of the Conditional Expression (2) beset as the following Conditional Expression (2)'.

$$0.20 < |\Delta D/fB| < 0.32 \qquad (2)'$$

In the catadioptric lens system, the second lens group G2, which is positioned on the image side of the concave mirror M1 and has a negative refractive power, is set as the focusing group. Therefore, it is possible to use the large space between the concave mirror M1 and the imaging surface as a variable stroke of focus. Further, since the lens positioned on the image side of the concave mirror M1 has a relatively small diameter, it becomes easy to arrange the driving mechanism of the focusing group. In particular, in the single-lens mirror-less camera system, the focusing group and the other lens groups can even be disposed in the space in which a mirror box is disposed in the related art. Hence, it is possible to secure a sufficient focus stroke, and it is possible to reduce the size of the entirety including the lenses and the camera.

Further, each lens surface of the concave mirror M1 and the convex mirror M2 is formed as a reflective surface, whereby it is possible to obtain a degree of freedom in correcting aberrations of the concave mirror M1 and the convex mirror M2. Further, since the focusing group is positioned to be relatively close to the imaging surface, it is possible to make the focusing group have less effect on the optical performance and be formed of a small number of lenses. Furthermore, since the sensitivity in eccentricity of the focusing group is also small, it is easy to manufacture the system.

In the catadioptric lens system, the second lens group G2 is formed of a single lens having a biconcave shape. With such a configuration, it is possible to secure the focus stroke as much as possible, and it is possible to further improve adaptability to moving image capturing such as an increase in the speed of autofocus which is achieved by reducing the weight of the focusing group. As described above, the focusing group can be configured to be extremely lightweight, and thus it is possible to improve a function of capturing a moving image, and it is also possible to reduce power consumption.

Further, the third lens group G3 is formed of a single lens of which the object-side surface has a convex shape. With such a configuration, it is possible to secure the focus stroke as much as possible, and it is possible to satisfactorily correct image field curvature and lateral chromatic aberration through the positive refractive power of the convex surface on the object side. Thereby, the system can be configured to have a small size while satisfactorily correcting image field curvature and lateral chromatic aberration.

The Conditional Expression (3) defines the magnitude of the focal length f1 of the first lens group G1 relative to the focal length f of the whole lens system. If the result value of the Conditional Expression (3) is less than the lower limit thereof, the positive refractive power of the first lens group G1 is excessively increased. Hence, spherical aberration produced by the first lens group G1 is increased, and thus the image quality deteriorates. Further, fluctuation in spherical aberration produced by focusing is increased, and thus it is difficult to correct the aberration. In contrast, if the result value of the Conditional Expression (3) is greater than the upper limit thereof, the positive refractive power of the first lens group G1 is excessively decreased. Hence, the length of the whole lens is increased, the zoom ratio is increased, and thus this is disadvantageous to reduction in size.

The Conditional Expression (4) defines the magnitude of the focal length f2 of the second lens group relative to the focal length f of the whole lens system. If the result value of the Conditional Expression (4) is less than the lower limit thereof, the negative refractive power of the second lens group G2 is excessively decreased. Hence, the focus sensitivity of the focusing group is decreased, the focus stroke is increased, and the length of the whole lens is increased. Further, the diameter of the third lens group G3 is also increased, and thus this is disadvantageous to reduction in size. In contrast, if the result value of the Conditional Expression (4) is greater than the upper limit thereof, the negative refractive power of the second lens group G2 is excessively increased. Hence, the focus stroke is reduced, but fluctuation in spherical aberration and image field curvature produced by focusing is increased, and thus it is difficult to correct them.

Accordingly, by making the catadioptric lens system satisfy the Conditional Expressions (3) and (4), it is possible to sufficiently reduce the size thereof and satisfactorily correct fluctuation in aberration produced by focusing. In order to improve this effect, it is more preferable that the numerical ranges of the Conditional Expressions (3) and (4) be set as the following Conditional Expressions (3)' and (4)'.

$$0.54 < f1/f < 0.62 \qquad (3)'$$

$$-0.15 < f2/f < -0.09 \qquad (4)'$$

The Conditional Expression (5) defines the magnitude of the focal length f of the whole lens system relative to the composite focal length f12 of the first lens group G1 and the second lens group G2. If the result value of the Conditional Expression (5) is less than the lower limit thereof, the rays emitted from the second lens group G2 are approximately afocal. Hence, load to the aberration correction between the second lens group G2 and the third lens group G3 is increased. As a result, the number of lenses is increased. In contrast, if the result value of the Conditional Expression (5) is greater than the upper limit thereof, the positive refractive power of the composition of the first lens group G1 and the second lens group G2 is excessively increased, the length of the whole optical system is increased, and the zoom ratio is also increased. As a result, this is disadvantageous to reduction in size. Accordingly, by satisfying the Conditional Expression (5), it is possible to reduce the size of the system while achieving favorable optical performance even in a case where the number of lenses is small. In order to improve this effect, it is more preferable that the numerical range of the Conditional Expression (5) be set as the following Conditional Expression (5)'.

$$0.55 < f/f12 < 0.74 \quad (5)'$$

The Conditional Expression (6) defines the magnitude of the focal length of the third lens group G3 relative to the focal length f of the whole lens system. If the result value of the Conditional Expression (6) is less than the lower limit thereof, the positive refractive power of the third lens group G3 is excessively increased. Hence, the diameter of the third lens group G3 is increased, and thus this is disadvantageous to reduction in size. In contrast, if the result value of the Conditional Expression (6) is greater than the upper limit thereof, the positive refractive power of the third lens group G3 is insufficient. Hence, the length of the whole optical system is increased, and thus this is disadvantageous to reduction in size. Accordingly, by making the catadioptric lens system satisfy the Conditional Expression (6), it is possible to sufficiently reduce the size of the system in the diameter direction and the direction of the length of the whole system. In order to improve this effect, it is more preferable that the numerical range of the Conditional Expression (6) be set as the following Conditional Expression (6)'.

$$0.14 < f3/f < 0.29 \quad (6)'$$

As described above, according to the catadioptric lens system according to the present embodiment, it is possible to optically correct hand shake, and it is possible to reduce the size and the weight of the vibration-proof group GS for the correction. Further, since the focusing mode is the inner focusing mode, it is possible to reduce the size and the weight of the focusing group, and it is easy to manufacture the focusing group such that the sensitivity in eccentricity of the focusing group is small. In addition, it is possible to obtain a long-focus lens system in which the size of the lens including the driving mechanisms of the focusing group and the vibration-proof group GS is made to be small.

Further, by applying the catadioptric lens system to an imaging apparatus and performing electric image processing, the length of the whole optical system is shortened, and the lens diameter of the first lens group G1 is reduced, and thus it is possible to further reduce the size of the lens system.

[Application Example of Imaging Apparatus]

FIG. 16 shows a configuration example of an imaging apparatus 100 to which the catadioptric lens system according to the present embodiment is applied. The imaging apparatus 100 is, for example, a digital still camera. A CPU (Central Processing Unit) 110 integrally controls the overall apparatus, converts an optical image, which is obtained by the catadioptric lens system 1 (or catadioptric lens system 2 or 3 shown in FIG. 2 or 3) shown in FIG. 1, into an electrical signal by an imaging device 140, and then outputs the signal to an image separation circuit 150. Here, as the imaging device 140, a photoelectric conversion element, such as a CCD (Charge Coupled Device), a CMOS (Complementary Metal-Oxide Semiconductor), is used. The image separation circuit 150 generates a focus control signal on the basis of the electrical signal, outputs this signal to the CPU 110, and outputs the image signal corresponding to an image portion of the electrical signal to an image processing circuit (not shown in the drawing) in the subsequent stage. The image processing circuit converts the received signal into a signal having a format appropriate for the subsequent processing. The converted signal is supplied for image display processing in a display section, recording processing on a prescribed recording medium, data transfer processing through a predetermined communication interface, and the like.

The CPU 110 receives an operation signal such as a focusing operation which is input from the outside, and performs a variety of processing in response to the operation signal. For example, when a focusing operation signal produced by a focusing button is supplied, the CPU 110 operates a drive motor 130 through a drive circuit 120 so as to attain the in-focus state according to the instruction. Thereby, the CPU 110 of the imaging apparatus 100 shifts the focusing lens group (the second lens group G2) of the catadioptric lens system 1 along the optical axis in response to the focusing operation signal. In this regard, positional information of the focusing lens group at that time is fed back to the CPU 110 of the imaging apparatus 100, and thus the CPU 110 refers to the information the next time it is shifting the focusing lens group through the drive motor 130.

The imaging apparatus 100 further includes a blur detection section that detects blur of the apparatus caused by hand shake. The CPU 110 operates the driving motor 130 through the driver circuit 120 on the basis of a signal which is output from the blur detection section. Thereby, the CPU 110 shifts the vibration-proof group GS in the direction perpendicular to the optical axis, in accordance with the amount of blur.

Note that, although the above description was given in a case where the specific object of the imaging apparatus 100 is a digital still camera, the present disclosure is not limited to this, and various other electronics may be the specific objects of the imaging apparatus 100. For example, For example, an interchangeable-lens camera, a digital video camera, and mobile phone in which the digital video camera is built, and various other electronics such as a PDA (Personal Digital Assistant) may be employed as the specific objects of the imaging apparatus 100.

EXAMPLES

Next, specific numerical examples of the catadioptric lens system according to the present embodiment will be described.

Note that, in the accompanying tables and description, the reference signs and the like are defined as follows. "si" represents the i-th surface, where the reference number i sequentially increases in order of light travel from the object side. Likewise, "ri" represents the radius of curvature (mm) of the i-th surface, where the reference number i sequentially increases in order of light travel. "di" represents the on-axis space (mm) between the i-th surface and an (i+1)th surface.

Further, regarding "di", "variable" means that the corresponding space is a variable space. "ni" represents the refractive index of a material of an optical element having the i-th surface at the d-line (a wavelength of 587.6 nm). "vi" represents the Abbe number of the material of the optical element having the i-th surface at the d-line.

Numerical Example 1

Tables 1 to 3 show lens data in which specific numerical values are applied to the catadioptric lens system 1 according to the first configuration example shown in FIG. 1. Particularly, Table 1 shows basic lens data, and Tables 2 and 3 show the other data.

In the catadioptric lens system 1, the second lens group G2 is shifted by focusing, and values of on-axis surface spaces D16 and D18 before and after the second lens group G2 is variable. Table 2 shows values of the variable on-axis surface spaces D16 and D18 during infinity focusing and during close-up focusing (photography magnification ratio β=0.1). Note that, in Table 2, "Fno" represents the F number, "ω" represents the half angle of view. "B.F." represents the back focal length, and also represents a distance in the optical axis from the final lens surface to the image plane Simg.

In the catadioptric lens system 1, the first lens group G1 includes, in order of light travel from the object side: a first lens L11 formed of a positive lens; a concave mirror (primary mirror) M1; a convex mirror (secondary mirror) M2; a second lens L12 formed of a negative lens; a third lens L13 formed of a positive lens; and a fourth lens L14 formed of a negative lens. The second lens L12, the third lens L13, and the fourth lens L14 are disposed on the image side of the concave mirror M1. The third lens L13 is formed as the vibration-proof group GS. The image-side surface of the concave mirror M1 is formed by forming a reflective surface on a part (other than the center portion) of the image-side surface of the lens which is concave toward the object side. The object-side surface of the convex mirror M2 is formed by forming a reflective surface on the overall object-side surface of the lens which is convex toward the image side. The second lens group G2 is formed of a single lens (negative lens L21) having a biconcave shape. The third lens group G3 is formed of a single lens (positive lens L31) of which the object-side surface has a convex shape.

In the catadioptric lens system 1, both surfaces of the third lens L13 (vibration-proof group GS) in the first lens group G1 are formed to be aspheric. Assuming that the vertex of the surface is the origin point, the optical axis direction is the X axis, and the height in the direction perpendicular to the optical axis is h, the shape of each aspheric surface can be represented by the expression below. It is the same for the aspheric surfaces of other examples to be described later. The radii of curvature of the aspheric surfaces in the lens data of Table 1 represent the numerical values of the radius of curvatures near the optical axis (paraxial). Table 3 shows data of the aspheric surface coefficients. In the numerical values shown in Table 3, the reference sign "E" means that a numerical value following this is a "power exponent" having a base of 10 and that this numerical value having a base of 10 and expressed by an exponential function is multiplied by a numerical value before the "E". For example, "1.0E−05" represents "$1.0 \times 10^{-5}$".

$$X = \frac{h^2/R}{1 + \sqrt{1 - (1+K)h^2/R^2}} + \sum A_i h^i$$

Here,
$A_i$ is the i-th order aspheric surface coefficient,
R is the paraxial radius of curvature, and
K is the conic constant.

TABLE 1

| | | si | ri | di | ni | vi |
|---|---|---|---|---|---|---|
| L11 | | 1 | r1 = 61.2261 | d1 = 2.667 | n1 = 1.51680 | v1 = 64.2 |
| | | 2 | r2 = −61.2261 | d2 = 12.167 | n2 = | v2 = |
| M1 | | 3 | r3 = −27.9262 | d3 = 1.667 | n3 = 1.80420 | v3 = 46.5 |
| | | 4 | r4 = −50.3641 | d4 = −1.667 | n4 = 1.80420 | v4 = 46.5 |
| | | 5 | r5 = −27.9262 | d5 = −10.100 | n5 = | v5 = |
| M2 | | 6 | r6 = −17.5321 | d6 = −1.167 | n6 = 1.51742 | v6 = 52.2 |
| | | 7 | r7 = −36.3905 | d7 = 1.167 | n7 = 1.51742 | v7 = 52.2 |
| | | 8 | r8 = −17.5321 | d8 = 10.100 | n8 = | v8 = |
| M1 | | 9 | r9 = −27.9262 | d9 = 1.667 | n9 = 1.80420 | v9 = 46.5 |
| | | 10 | r10 = −50.3641 | d10 = 0.331 | n10 = | v10 = |
| L12 | | 11 | r11 = −51.0300 | d11 = 0.500 | n11 = 1.83481 | v11 = 42.7 |
| | | 12 | r12 = 16.6451 | d12 = 0.833 | n12 = | v12 = |
| L13 | | 13 | r13 = 9.3575 | d13 = 1.520 | n13 = 1.76802 | v13 = 49.2 |
| | | 14 | r14 = −18.0286 | d14 = 0.167 | n14 = | v14 = |
| L14 | | 15 | r15 = 21.1047 | d15 = 0.500 | n15 = 1.80420 | v15 = 46.5 |
| | | 16 | r16 = 7.9304 | d16 = Variable | n16 = | v16 = |
| L21 | | 17 | r17 = −83.4970 | d17 = 0.500 | n17 = 1.83481 | v17 = 42.7 |
| | | 18 | r18 = 10.8150 | d18 = Variable | n18 = | v18 = |
| L31 | | 19 | r19 = 10.3027 | d19 = 1.163 | n19 = 1.84666 | v19 = 23.8 |
| | | 20 | r20 = 21.1376 | d20 = | n20 = | v20 = |

TABLE 2

| | Example 1 | |
|---|---|---|
| | Infinity Focusing | Close-Up Focusing (β = 0.1) |
| Focal Length | 100.00 | |
| Fno. | 4.60 | |
| ω (degree) | 2.66 | |
| B.F. | 5.773 | |
| d16 | 1.121 | 5.782 |

TABLE 2-continued

| | Example 1 | |
|---|---|---|
| | Infinity Focusing | Close-Up Focusing (β = 0.1) |
| d18 | 8.031 | 3.371 |
| 0.2° Amount of Lens Shift for Preventing Vibration | 0.165 | |

TABLE 3

| | | Example 1 | | | |
|---|---|---|---|---|---|
| si | K | A4 | A6 | A8 | A10 |
| 13 | 0 | −4.18191E−05 | −8.18418E−06 | −1.03295E−07 | −174558E−09 |
| 14 | 0 | 3.27288E−04 | −1.23083E−05 | 0.00000E+00 | 0.00000E+00 |

Numerical Example 2

Similar to Numerical Example 1 mentioned above, Tables 4 to 6 show lens data, in which specific numerical values are applied to the catadioptric lens system 2 according to the second configuration example shown in FIG. 2, through Numerical Example 2.

In the catadioptric lens system 2, the second lens group G2 is shifted by focusing, and values of on-axis surface spaces D14 and D16 before and after the second lens group G2 is variable. Table 5 shows values of the variable on-axis surface spaces D14 and D16 during infinity focusing and during close-up focusing (photography magnification ratio β=0.1).

In the catadioptric lens system 2, the basic lens configurations of the second lens group G2 and third lens group G3 are substantially the same as the basic lens configurations of the catadioptric lens system 1 of FIG. 1, but there is a difference therebetween in the lens configuration of the first lens group G1. In the catadioptric lens system 2, the first lens group G1 includes, in order of light travel from the object side: a first lens L11 formed of a positive lens; a concave mirror (primary mirror) M1; a convex mirror (secondary mirror) M2; a second lens L12 formed of a negative lens; and a third lens L13 formed of a positive lens. The second lens L12 and the third lens L13 are disposed on the image side of the concave mirror M1. The second lens L12 is formed as the vibration-proof group GS. The image-side surface of the concave mirror M1 is formed by forming a reflective surface on a part (other than the center portion) of the image-side surface of the lens which is concave toward the object side. The object-side surface of the convex mirror M2 is formed by forming a reflective surface on the overall object-side surface of the lens which is convex toward the image side.

In the catadioptric lens system 2, both surfaces of each of the second lens L12 (vibration-proof group GS) and the third lens L13 in the first lens group G1 are formed to be aspheric. The radii of curvature of the aspheric surfaces in the lens data of Table 4 represent the numerical values of the radius of curvatures near the optical axis (paraxial). Table 6 shows data of the aspheric surface coefficients.

TABLE 4

Example 2

|  | si | ri | di | ni | vi |
|---|---|---|---|---|---|
| L11 | 1 | r1 = 62.7205 | d1 = 2.667 | n1 = 1.54072 | v1 = 47.2 |
|  | 2 | r2 = −62.7205 | d2 = 12.166 | n2 = | v2 = |
| M1 | 3 | r3 = −27.7986 | d3 = 1.667 | n3 = 1.91082 | v3 = 35.3 |
|  | 4 | r4 = −47.1162 | d4 = −1.667 | n4 = 1.91082 | v4 = 35.3 |
|  | 5 | r5 = −27.7986 | d5 = −10.100 | n5 = | v5 = |
| M2 | 6 | r6 = −16.6152 | d6 = −1.167 | n6 = 1.54814 | v6 = 45.8 |
|  | 7 | r7 = −33.3809 | d7 = 1.167 | n7 = 1.54814 | v7 = 45.8 |
|  | 8 | r8 = −16.6152 | d8 = 10.100 | n8 = | v8 = |
| M1 | 9 | r9 = −27.7986 | d9 = 1.667 | n9 = 1.91082 | v9 = 35.3 |
|  | 10 | r10 = −47.1162 | d10 = 1.000 | n10 = | v10 = |
| L12 | 11 | r11 = −12.2016 | d11 = 0.467 | n11 = 1.77377 | v11 = 47.2 |
|  | 12 | r12 = 7.4465 | d12 = 0.833 | n12 = | v12 = |
| L13 | 13 | r13 = 10.1154 | d13 = 1.636 | n13 = 1.76802 | v13 = 49.2 |
|  | 14 | r14 = −10.8756 | d14 = Variable | n14 = | v14 = |
| L21 | 15 | r15 = −54.9287 | d15 = 0.467 | n15 = 1.83481 | v15 = 42.7 |
|  | 16 | r16 = 10.1266 | d16 = Variable | n16 = | v16 = |
| L31 | 17 | r17 = 10.5182 | d17 = 2.365 | n17 = 1.64769 | v17 = 33.8 |
|  | 18 | r18 = −183.4407 | d18 = | n18 = | v18 = |

TABLE 5

Example 2

|  | Infinity Focusing | Close-Up Focusing ($\beta = 0.1$) |
|---|---|---|
| Focul Length | 100.00 |  |
| Fno. | 4.58 |  |
| ω (degree) | 2.66 |  |
| B.F. | 5.273 |  |
| d14 | 0.604 | 6.093 |
| d16 | 6.962 | 1.473 |
| 0.2° Amount of Lens Shift for Preventing Vibration | 0.165 |  |

TABLE 6

Example 2

| si | K | A4 | A6 | A8 | A10 |
|---|---|---|---|---|---|
| 11 | 0 | −8.06044E−05 | −3.12034E−05 | 3.57081E−06 | −1.70033E−07 |
| 12 | 0 | −1.05137E−03 | 2.85060E−07 | 0.00000E+00 | 0.00000E+00 |
| 13 | 0 | −4.94710E−04 | 1.63652E−06 | −8.57987E−07 | 3.24949E−08 |
| 14 | 0 | 9.38537E−05 | −9.36149E−06 | 0.00000E+00 | 0.00000E+00 |

Numerical Example 3

Likewise, Tables 7 to 9 show lens data, in which specific numerical values are applied to the catadioptric lens system 3 according to the third configuration example shown in FIG. 3, through Numerical Example 3.

In the catadioptric lens system 3, the second lens group G2 is shifted by focusing, and values of on-axis surface spaces D14 and D16 before and after the second lens group G2 is variable. Table 8 shows values of the variable on-axis surface spaces D14 and D16 during infinity focusing and during close-up focusing (photography magnification ratio β=0.1).

In the catadioptric lens system 3, the basic lens configurations of the second lens group G2 and third lens group G3 are substantially the same as the basic lens configurations of the catadioptric lens system 1 of FIG. 1, but there is a difference therebetween in the lens configuration of the first lens group G1. In the catadioptric lens system 3, the first lens group G1 includes, in order of light travel from the object side: a first lens L11 formed of a positive lens; a concave mirror (primary mirror) M1; a convex mirror (secondary mirror) M2; a second lens L12 formed of a negative lens; and a third lens L13 formed of a positive lens. The second lens L12 and the third lens L13 are disposed on the image side of the concave mirror M1. The third lens L13 is formed as the vibration-proof group GS. The image-side surface of the concave mirror M1 is formed by forming a reflective surface on a part (other than the center portion) of the image-side surface of the lens which is concave toward the object side. The object-side surface of the convex mirror M2 is formed by forming a reflective surface on the overall object-side surface of the lens which is convex toward the image side.

In the catadioptric lens system 3, the third lens L13 as the vibration-proof group GS is made of plastic. By using a plastic material for the vibration-proof group GS, it is possible to reduce the weight of the vibration-proof group GS, and thus it is possible to reduce the size of the moving mechanism of the vibration-proof group GS.

In the catadioptric lens system 3, the image-side surface of the second lens L12 and both surfaces of the third lens L13 (vibration-proof group GS) in the first lens group G1 are formed to be aspheric. The radii of curvature of the aspheric surfaces in the lens data of Table 7 represent the numerical values of the radius of curvatures near the optical axis (paraxial). Table 9 shows data of the aspheric surface coefficients.

TABLE 7

Example 3

| | si | ri | di | ni | νi |
|---|---|---|---|---|---|
| L11 | 1 | r1 = 85.8464 | d1 = 2.400 | n1 = 1.58144 | ν1 = 40.9 |
| | 2 | r2 = −85.8464 | d2 = 14.399 | n2 = | ν2 = |
| M1 | 3 | r3 = −35.2714 | d3 = 2.000 | n3 = 1.90366 | ν3 = 31.3 |
| | 4 | r4 = −60.8128 | d4 = −2.000 | n4 = 1.90366 | ν4 = 31.3 |
| | 5 | r5 = −35.2714 | d5 = −11.920 | n5 = | ν5 = |
| M2 | 6 | r6 = −26.8853 | d6 = −1.400 | n6 = 1.62588 | ν6 = 35.7 |
| | 7 | r7 = −56.3871 | d7 = 1.400 | n7 = 1.62588 | ν7 = 35.7 |
| | 8 | r8 = −26.8853 | d8 = 11.920 | n8 = | ν8 = |
| M1 | 9 | r9 = −35.2714 | d9 = 2.000 | n9 = 1.90366 | ν9 = 31.3 |
| | 10 | r10 = −60.8128 | d10 = 0.630 | n10 = | ν10 = |
| L12 | 11 | r11 = −17.8701 | d11 = 0.600 | n11 = 1.80139 | ν11 = 45.4 |
| | 12 | r12 = 13.1168 | d12 = 1.000 | n12 = | ν12 = |
| L13 | 13 | r13 = 10.3532 | d13 = 2.541 | n13 = 1.53110 | ν13 = 55.9 |
| | 14 | r14 = −9.8539 | d14 = Variable | n14 = | ν14 = |
| L21 | 15 | r15 = −51.7594 | d15 = 0.600 | n15 = 1.78800 | ν15 = 47.5 |
| | 16 | r16 = 14.8651 | d16 = Variable | n16 = | ν16 = |
| L31 | 17 | r17 = 13.1016 | d17 = 1.314 | n17 = 1.84666 | ν17 = 23.8 |
| | 18 | r18 = 27.5274 | d18 = | n18 = | ν18 = |

TABLE 8

Example 3

| | Infinity Focusing | Close-Up Focusing ($\beta = 0.1$) |
|---|---|---|
| Focal Length | 100.00 | |
| Fno. | 4.56 | |
| ω (degree) | 3.19 | |
| B.F. | 7.137 | |
| d14 | 1.210 | 6.830 |
| d16 | 7.894 | 2.274 |
| 0.2° Amount of Lens Shift for Preventing Vibration | 0.200 | |

TABLE 9

Example 3

| si | K | A4 | A6 | A8 | A10 |
|---|---|---|---|---|---|
| 12 | 0 | −2.69145E−04 | 1.02119E−05 | −6.83957E−07 | 1.74955E−08 |
| 13 | 0 | −3.64963E−04 | 5.52569E−06 | −3.60012E−07 | 6.84940E−09 |
| 14 | 0 | 2.08050E−04 | −1.89996E−06 | 0.00000E+00 | 0.00000E+00 |

Other Numerical Value Data of Respective Examples

Tables 10 and 11 show collections of values relating to the respective conditional expressions mentioned above in the respective numerical examples. As can be seen from Table 10, the values of the respective numerical examples are within the numerical ranges of the respective conditional expressions.

TABLE 10

| Conditional Expression | Example 1 | Example 2 | Example 3 |
|---|---|---|---|
| (1)\|fB/f\| | 0.082 | 0.059 | 0.099 |
| (2)\|ΔD/fB\| | 0.240 | 0.197 | 0.315 |
| (3)f1/f | 0.570 | 0.619 | 0.612 |
| (4)f2/f | −0.114 | −0.102 | −0.145 |

TABLE 10-continued

| Conditional Expression | Example 1 | Example 2 | Example 3 |
|---|---|---|---|
| (5)f/f12 | 0.692 | 0.570 | 0.701 |
| (6)f3/f | 0.224 | 0.153 | 0.281 |

TABLE 11

| Reference Sign | Example 1 | Example 2 | Example 3 |
|---|---|---|---|
| fB | 8.180 | −5.885 | 9.898 |
| f | 100.000 | 100.000 | 100.000 |

TABLE 11-continued

| Reference Sign | Example 1 | Example 2 | Example 3 |
|---|---|---|---|
| ΔD | 1.965 | 1.161 | 3.118 |
| f1 | 57.010 | 61.860 | 61.227 |
| f2 | −11.379 | −10.153 | −14.525 |
| f12 | 144.508 | 175.478 | 142.564 |
| f3 | 22.399 | 15.326 | 28.061 |

[Aberration Performance]

FIGS. 4A to 4C show spherical aberration, astigmatism, and distortion during infinity focusing of the catadioptric lens system 1 corresponding to Numerical Example 1. FIGS. 5A to 5C show the same aberrations during close-up focusing. Each aberration diagram shows aberrations when the d-line (the wavelength of 587.6 nm) is set as a reference wavelength.

In each spherical aberration diagram, the vertical axis indicates a ratio of the aberration to a full-aperture F value, the horizontal axis represents defocus, the solid line represents a value thereof at the d-line (a wavelength of 587.6 nm), the chain line represents a value thereof at the g-line (a wavelength of 435.8 nm), and the dotted line represents a value thereof at C-line (a wavelength of 656.3 nm). In each astigmatism diagram, the vertical axis represents the angle of view, the horizontal axis represents defocus, the solid line represents a value thereof on the sagittal image plane, and the dashed line represents a value thereof on the meridional image plane. In each distortion diagram, the vertical axis represents the angle of view, and the horizontal axis represents the percentage %. ω represents the half angle of view.

Further, FIGS. 6A to 6C and 7A to 7C show lateral aberrations during infinity focusing. In particular, FIGS. 7A to 7C show lateral aberrations in a state where the lens is shifted by 0.2° during infinity focusing. The specific values of the lens shift are written in Table 2.

Likewise, FIGS. 8A to 8C and 9A to 9C show spherical aberration, astigmatism, and distortion of the catadioptric lens system 2 corresponding to Numerical Example 2. Further, FIGS. 10A to 10C and 11A to 11C show lateral aberrations during infinity focusing. In particular, FIGS. 11A to 11C show lateral aberrations in a state where the lens is shifted by 0.2° during infinity focusing. The specific values of the lens shift are written in Table 5.

Likewise, FIGS. 12A to 12C and 13A to 13C show spherical aberration, astigmatism, and distortion of the catadioptric lens system 3 corresponding to Numerical Example 3. Further, FIGS. 14A to 14C and 15A to 15C show lateral aberrations during infinity focusing. In particular, FIGS. 15A to 15C show lateral aberrations in a state where the lens is shifted by 0.2° during infinity focusing. The specific values of the lens shift are written in Table 8.

As can be seen from the respective aberration diagrams, it is apparent that, in each example, the various aberrations are satisfactorily corrected, and imaging performance, which is favorable even during close-up focusing at the photography magnification ratio β of 0.1, is obtained. Further, imaging performance, which is favorable even in a state where hand shake is corrected by 0.2°, is obtained.

Other Embodiments

The technology according to the present disclosure is not limited to the description of the examples and the embodiments mentioned above, and may be modified into various forms.

The shapes of components and the numerical values described or shown in the above-mentioned numerical embodiments are only illustrative examples of the embodiments for carrying out the present disclosure, and they should not be interpreted as limiting the technical scope of the present disclosure.

Further, the above-mentioned embodiments and examples described the configuration in which the lens system is formed of three lens groups. However, it may be possible to adopt a configuration in which a lens, which has no refractive power in practice, is further provided.

Furthermore, for example, the technology according to the present disclosure may have the following configurations.

(1) A catadioptric lens system including, in order of light travel:

a first lens group that includes a concave mirror and a convex mirror and has a positive refractive power;

a second lens group that is positioned on the image side of the concave mirror and has a negative refractive power; and a third lens group that has a positive refractive power, wherein the first lens group has a plurality of lenses on the image side of the concave mirror, and some lenses of the plurality of lenses are formed as a vibration-proof group so as to be movable in a direction perpendicular to an optical axis.

(2) The catadioptric lens system according to item (1), wherein the following conditional expression is satisfied $$0.03 < |fB/f| < 0.15 \quad (1),$$

where f is a focal length of the whole system in a state where the focus is at infinity, and fB is a focal length of the vibration-proof group.

(3) The catadioptric lens system according to item (1) or (2), wherein the following conditional expression is satisfied $$0.10 < |\Delta D/fB| < 0.50 \quad (2),$$

where ΔD is a space between a vertex of a reflective surface of the concave mirror and an object-side principal point of the vibration-proof group in a direction of the optical axis.

(4) The catadioptric lens system according to any one of items (1) to (3), wherein a close-range object is brought into focus by moving the second lens group in a direction parallel with the optical axis, and wherein the following conditional expression is satisfied $$0.40 < f1/f < 0.80 \quad (3), \text{ and}$$

$$-0.20 < f2/f < -0.05 \quad (4),$$

where f1 is a focal length of the first lens group, and f2 is a focal length of the second lens group.

(5) The catadioptric lens system according to any one of items (1) to (4), wherein the following conditional expression is satisfied $$0.40 < f/f12 < 1.00 \quad (5),$$

where f12 is a composite focal length of the first lens group and the second lens group in a state where the focus is at infinity.

(6) The catadioptric lens system according to any one of items (1) to (5), wherein the following conditional expression is satisfied $$0.10 < f3/f < 0.40 \quad (6),$$

where f3 is a focal length of the third lens group.

(7) The catadioptric lens system according to any one of items (1) to (6), wherein the vibration-proof group has one or more aspheric surfaces (8) The catadioptric lens system according to any one of items (1) to (7), wherein the first lens group includes, in order from the object side, a negative lens and a positive lens on the image side of the concave mirror, and the positive lens is formed as the vibration-proof group so as to be movable in the direction perpendicular to the optical axis.

(9) The catadioptric lens system according to any one of items (1) to (7), wherein the plurality of lenses in the first lens group has a negative lens at a position closest to the object side, and the negative lens is formed as the vibration-proof group so as to be movable in the direction perpendicular to the optical axis.

(10) The catadioptric lens system according to any one of items (1) to (9),
wherein an image-side surface of the concave mirror is formed by forming a reflective surface on a part of the image-side surface in a lens which is concave toward the object side, and
wherein an object-side surface of the convex mirror is formed by forming a reflective surface on the object-side surface in a lens which is convex toward the image side.

(11) The catadioptric lens system according to any one of items (1) to (10), further including a lens that has no refractive power in practice.

(12) An imaging apparatus including:
a catadioptric lens system; and
an imaging device that outputs a captured image signal corresponding to an optical image which is formed by the catadioptric lens system,
wherein the catadioptric lens system includes,
in order of light travel,
a first lens group that includes a concave mirror and a convex mirror and has a positive refractive power;
a second lens group that is positioned on the image side of the concave mirror and has a negative refractive power; and
a third lens group that has a positive refractive power, and
wherein the first lens group has a plurality of lenses on the image side of the concave mirror, and some lenses of the plurality of lenses are formed as a vibration-proof group so as to be movable in a direction perpendicular to an optical axis.

(13) The imaging apparatus according to item (12), wherein the catadioptric lens system further includes a lens that has no refractive power in practice.

The present disclosure contains subject matter related to that disclosed in Japanese Priority Patent Application JP 2011-149110 filed in the Japan Patent Office on Jul. 5, 2011, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A catadioptric lens system comprising, in order of light travel:
a first lens group that includes a concave mirror and a convex mirror and has a positive refractive power;
a second lens group that is positioned on the image side of the concave mirror and has a negative refractive power, the second lens group having at least one second group lens; and
a third lens group that has a positive refractive power, the third lens group having at least one third group lens,
wherein the first lens group has a plurality of first group lenses on the image side of the concave mirror, and at least one of the plurality of the first group lenses is movable only in a direction perpendicular to an optical axis, the optical axis defining a longitudinal direction and
wherein the catadioptric lens system is operable in a focused state and during a focusing state such that, in the focused state, the first lens group, the second lens group and the third lens group are stationary along the optical axis in the longitudinal direction while the at least one of the plurality of the first group lenses is configured to move in the direction perpendicular to the optical axis and, during the focusing state, the second lens group moves along the optical axis in the longitudinal direction between the first lens group and the third lens group while the first lens group and the third lens group remain stationary along the optical axis in the longitudinal direction and the at least one of the plurality of the first group lenses remains configured to move in the direction perpendicular to the optical axis.

2. The catadioptric lens system according to claim 1, wherein the following conditional expression is satisfied $$0.03<|fB/f|<0.15 \quad (1)$$

where
f is a focal length of the whole system in a state where the focus is at infinity, and
fB is a focal length of the vibration-proof group.

3. The catadioptric lens system according to claim 1, wherein the following conditional expression is satisfied $$0.10<|\Delta D/fB|<0.50 \quad (2)$$

where $\Delta D$ is a space between a vertex of a reflective surface of the concave mirror and an object-side principal point of the vibration-proof group in a direction of the optical axis.

4. The catadioptric lens system according to claim 1, wherein a close-range object is brought into focus by moving the second lens group in a direction parallel with the optical axis, and
wherein the following conditional expressions are satisfied $$0.40<f1/f<0.80 \quad (3)$$

$$-0.20<f2/f<-0.05 \quad (4)$$

where
f1 is a focal length of the first lens group, and
f2 is a focal length of the second lens group.

5. The catadioptric lens system according to claim 1, wherein the following conditional expression is satisfied $$0.40<f/f12<1.00 \quad (5)$$

where f12 is a composite focal length of the first lens group and the second lens group in a state where the focus is at infinity.

6. The catadioptric lens system according to claim 1, wherein the following conditional expression is satisfied $$0.10<f3/f<0.40 \quad (6)$$

where f3 is a focal length of the third lens group.

7. The catadioptric lens system according to claim 1, wherein the vibration-proof group has one or more aspheric surfaces.

8. The catadioptric lens system according to claim 1, wherein the first lens group includes, in order from the object side, a negative lens and a positive lens on the image side of the concave mirror, and the positive lens is formed as the vibration-proof group so as to be movable in the direction perpendicular to the optical axis.

9. The catadioptric lens system according to claim 1, wherein the plurality of lenses in the first lens group has a negative lens at a position closest to the object side, and the negative lens is formed as the vibration-proof group so as to be movable in the direction perpendicular to the optical axis.

10. The catadioptric lens system according to claim 1,
wherein an image-side surface of the concave mirror is formed by forming a reflective surface on a part of the image-side surface in a lens which is concave toward the object side, and
wherein an object-side surface of the convex mirror is formed by forming a reflective surface on the object-side surface in a lens which is convex toward the image side.

11. An imaging apparatus comprising:
a catadioptric lens system; and
an imaging device that outputs a captured image signal corresponding to an optical image which is formed by the catadioptric lens system,
wherein the catadioptric lens system includes,
in order of light travel,
a first lens group that includes a concave mirror and a convex mirror and has a positive refractive power;
a second lens group that is positioned on the image side of the concave mirror and has a negative refractive power, the second lens group having at least one second group lens; and
a third lens group that has a positive refractive power, the third lens group having at least one third group lens, and
wherein the first lens group has a plurality of first group lenses on the image side of the concave mirror, and at least one of the plurality of first group lenses is movable only in a direction perpendicular to an optical axis, the optical axis defining a longitudinal direction and
wherein the imaging apparatus is operable in a focused state and during a focusing state such that, in the focused state, the first lens group, the second lens group and the third lens group are stationary along the optical axis in the longitudinal direction while the at least one of the plurality of the first group lenses is configured to move in the direction perpendicular to the optical axis and, during the focusing state, the second lens group moves along the optical axis in the longitudinal direction between the first lens group and the third lens group while the first lens group and the third lens group remain stationary along the optical axis in the longitudinal direction and the at least one of the plurality of the first group lenses remains configured to move in the direction perpendicular to the optical axis.

* * * * *